United States Patent [19]

Shaw et al.

[11] Patent Number: 5,599,507

[45] Date of Patent: Feb. 4, 1997

[54] REACTOR APPARATUS FOR PREPARING A POLYMERIC MATERIAL

[76] Inventors: Gordon Shaw, 6947 Candlewyck La., Charlotte, N.C. 28226; Rainer A. Schaller, Elias-Holl-Str. 7, 86637 Wertingen, Germany; W. Jeffrey Stikeleather, 6826 Windyrush Rd., Charlotte, N.C. 28226; Michael D. Melton, 2515 Grey Rd., Davidson, N.C. 28036; Harmut Hey, Beethovenring 23, D 55283 Nierstein, Germany; Roland Schmidt, Trajanstr. 8, 55737 Mainz, Germany; Rolf Hartmann, Lenthahner Weg 2, 65817 Eppstein, Germany; Hans Lohe, Kieternweg 18, 61476 Kraberg, Germany

[21] Appl. No.: 336,446

[22] Filed: Nov. 9, 1994

[51] Int. Cl.$^6$ ........................................... B01F 7/10
[52] U.S. Cl. ........................... 422/135; 422/134; 422/137; 422/138; 422/193; 422/195; 422/225; 366/312
[58] Field of Search ................................. 422/134, 135, 422/137, 138, 193, 195, 202, 225; 366/279, 309, 312

[56] References Cited

U.S. PATENT DOCUMENTS

| | | | |
|---|---|---|---|
| 3,057,702 | 10/1962 | Pierce et al. | 422/137 |
| 3,248,180 | 4/1966 | Kilpatrick | 422/137 |
| 3,423,363 | 1/1969 | Fournel | 528/270 |
| 3,440,019 | 4/1969 | Albrecht et al. | 422/134 |
| 3,443,909 | 5/1969 | Goossens | 422/108 |
| 3,591,344 | 7/1971 | Schnock et al. | 422/135 |
| 3,630,688 | 12/1971 | Takiguchi et al. | 422/135 |
| 3,686,826 | 8/1972 | Saunders et al. | 95/260 |
| 3,728,083 | 4/1973 | Greenburg et al. | 422/137 |
| 3,867,104 | 2/1975 | Leybourne et al. | 422/137 |
| 4,207,202 | 6/1980 | Cole, Jr. | 422/135 |
| 4,370,302 | 1/1983 | Suzuoka et al. | 422/225 |
| 4,552,724 | 11/1985 | Matsumoto et al. | 422/138 |
| 4,729,877 | 3/1988 | Hennig et al. | 422/134 |
| 4,734,263 | 3/1988 | Gerking et al. | 422/135 |
| 4,769,427 | 9/1988 | Nowakowsky et al. | 526/64 |
| 4,801,433 | 1/1989 | Yamanaka et al. | 422/228 |
| 4,985,208 | 1/1991 | Sugawara et al. | 422/135 |
| 5,055,273 | 10/1991 | Wilhelm et al. | 422/135 |
| 5,145,255 | 9/1992 | Shimada et al. | 366/325.92 |
| 5,245,057 | 9/1993 | Shirtum | 422/135 |

OTHER PUBLICATIONS

Calculation of the Power Consumed for Mixing in Incompletely Filled Horizontal Reactions. G. M. Sychev, A. M. Zhurba, S. V. Kurilov, and V. V. Oblogin, UDC 66.023.001.24.

Power Requirements of Mixers with Blades for High-Viscosity Newtonian Liquids. L. S. Rozanov and A. M. Lastovtsev, UDC 66.063.8.

*Primary Examiner*—Robert J. Warden
*Assistant Examiner*—Robert Carpenter

[57] ABSTRACT

A polycondensation reactor for processing low viscosity polyester or another polymer into relatively highly viscosity polymer comprises a substantially cylindrical horizontal reactor vessel with a polymer inlet and a polymer outlet adjacent its opposite ends and a vapor exhaust opening in the upper side of the vessel at its outlet end. A polymer agitator is rotated axially within the chamber and includes plural alternating annular overflow and underflow baffles and multiple perforated film-forming screens disposed therebetween in parallel spaced relation to one another. The overflow baffles are in peripheral polymer-sealing relation to the vessel while the underflow baffles have multiple underflow recesses in their outer peripheries, whereby the baffles define a tortuous polymer flow path alternately through their respective polymer overflow and underflow openings to control residence time, distribution and viscosity growth as the polymer flows between the baffles. The baffles and screens are integrally fixed coaxially at their outer peripheries by axially extending wiper bars. Aligned openings in the baffles and screens along the rotational axis of the agitator provide for free flow of volatiles to the exhaust opening.

39 Claims, 13 Drawing Sheets

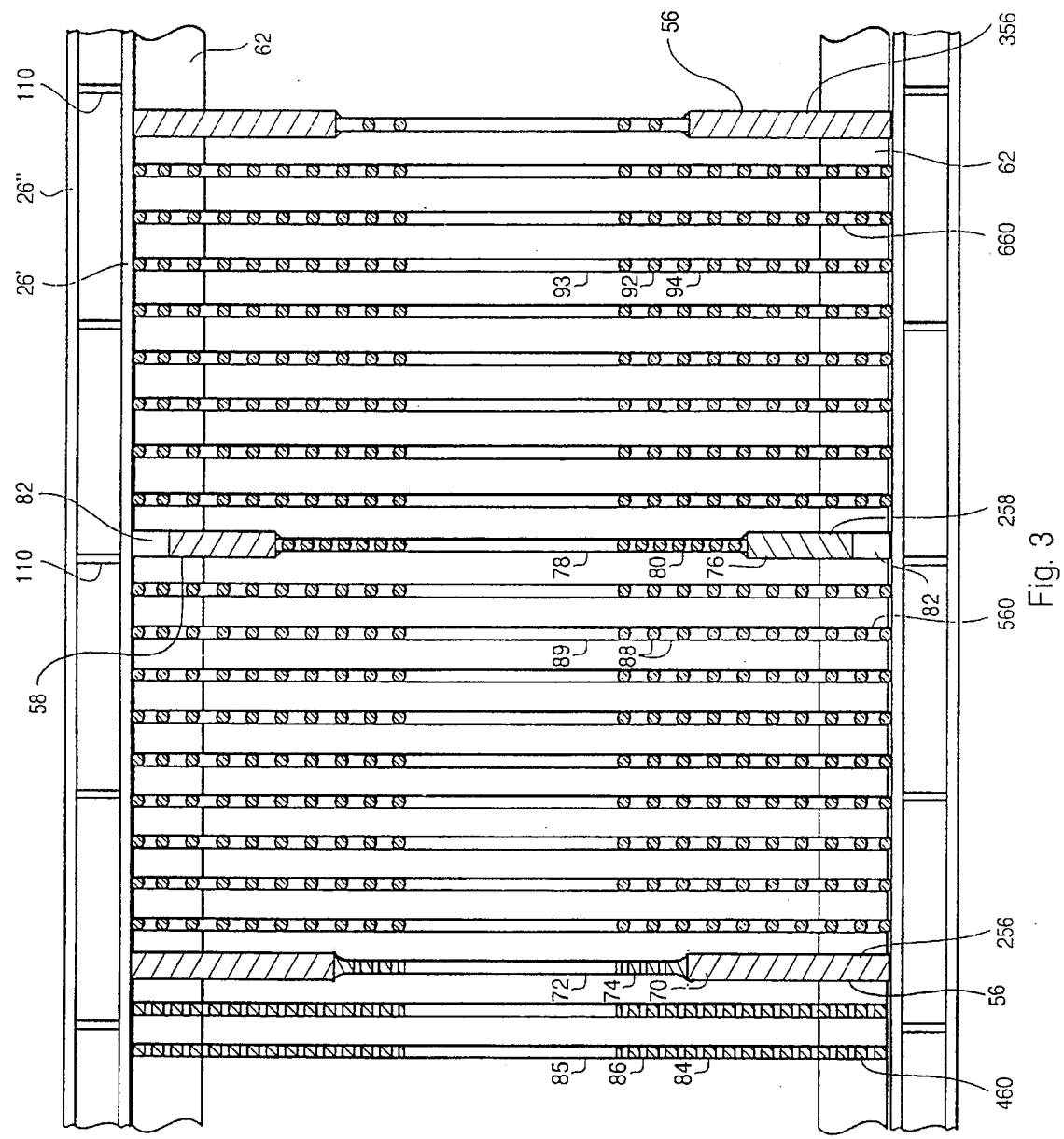

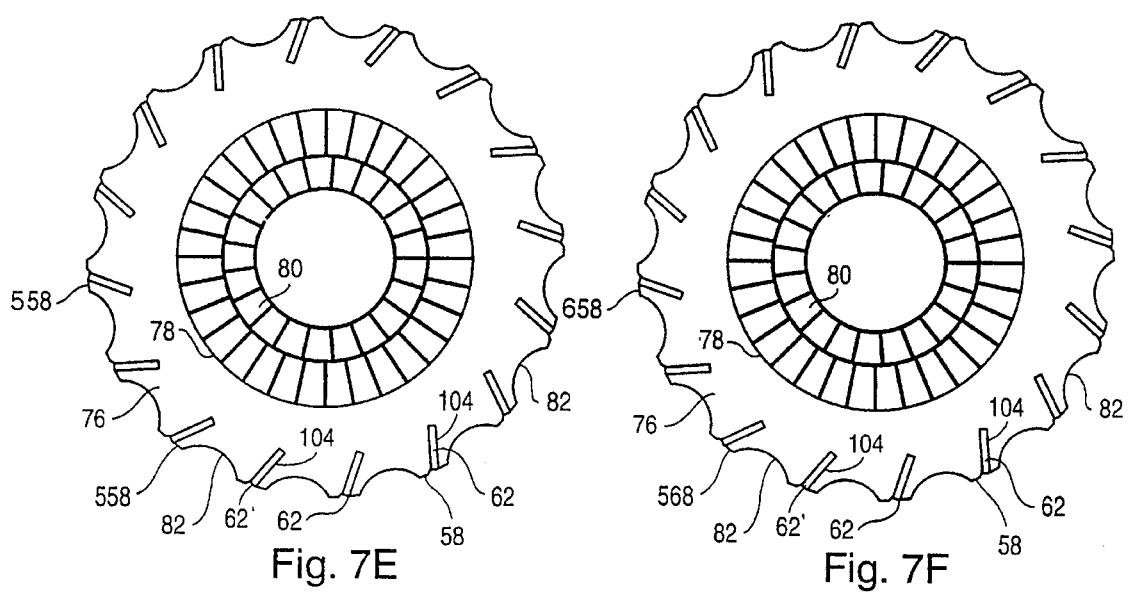

REACTOR APPARATUS FOR PREPARING A POLYMERIC MATERIAL

FIELD OF THE INVENTION

The present invention relates generally to a reactor apparatus for use in preparing a polymeric material and, more particularly, to a polycondensation reactor apparatus adapted for use in converting a polymeric liquid of low viscosity into a polymeric liquid of relatively higher viscosity by promoting evaporation of a volatile constituent material from the polymer.

BACKGROUND OF THE INVENTION

Commercial preparation of condensation polymers such as polyesters and polyamides is characteristically accomplished by a process known as polycondensation performed in a reactor vessel wherein some form of agitator is used to induce evaporative release of a volatile constituent material in the polymer being processed. In this manner, the viscosity of the polymer and the viscous uniformity thereof may be selectively increased.

In a conventional vessel of the aforedescribed type, this polycondensation process is carried out continuously by introducing the low viscosity polymer at one end of the vessel and conveying it through the vessel to an outlet adjacent the opposite end of the vessel, while subjecting the polymer to the action of the agitator during the period of residence of the polymer within the vessel. The vessel is oriented on a horizontal axis and the agitator is characteristically in the form of a coaxially rotated cage having perforated or otherwise screen-like elements mounted radially to a central drive shaft to be progressively coated with the polymer and also having peripheral wiping elements to progressively apply a film-like coating of the polymer to the annular interior wall of the vessel, the combined action of the screens and wiping elements serving to increase the exposed evaporative surface of the polymer as the agitator progressively rotates. Such apparatus are commonly referred to in the trade as "wiped wall" polymer reactors, one representative example of such a reactor being disclosed in U.S. Pat. No. 3,248,180.

As polymer technology has advanced and industry has continued to demand polymers of greater uniformity and overall quality, conventional reactor apparatus suffer several disadvantages in this regard. First, the presence of a central shaft through the length of the agitator tends to restrict evaporative flow of volatiles to an exhaust outlet commonly located in the upper region of the discharge end of the vessel and also forms a collection surface on which polymer in adjacent stagnant areas may collect and ultimately become overheated, producing carbonaceous contaminants within the polymeric material. Buildups of the polymeric material can similarly occur at other stagnant regions within the vessel, especially in the end and upper regions of the vessel which may not be satisfactorily wiped by the agitator. The Necessity of mounting the screens to the shaft also limits the closeness at which the screens may be spaced from one another, in turn limiting the evaporative capacity of the vessel. Volumetric capacity of conventional polycondensation vessels is limited by the need to prevent overheating of the polymeric material. A related problem is the inability of conventional reactors to non-invasively measure polymer temperature within the vessel.

SUMMARY OF THE INVENTOIN

It is accordingly an object of the present invention to provide an improved reactor apparatus for use in preparing a polymeric material which overcomes the problems and disadvantages of the prior art. More specifically, it is an object of the present invention to provide an improved polymer reactor of the "wiped wall" type having a substantially increased volumetric capacity while at the same time being capable of preparing polymers by the polycondensation process to a suitably high level of viscosity and high degree of viscous uniformity with reduced risk of polymer overheating and polymer contamination in comparison to conventional reactors. Particular objects of the present invention are to provide a "wiped wall" polymer polycondensation reactor having a novel agitator without a central shaft, with a novel polymer baffling arrangement for controlling polymer flow, and with an improved ability to achieve progressive wiping of substantially all interior surfaces within the polymer processing chamber of the vessel. Another object is to provide a novel means of controlling polymer temperature within the reactor vessel by non-invasive measurement of polymer temperature and a novel means of heat exchange cooling and/or heating of the polymer within the vessel. Other objects of the invention will be apparent from the disclosure of a preferred embodiment of the present invention hereinafter.

Briefly summarized, the present invention accomplishes the foregoing objectives by providing improvements in a reactor apparatus of the basic type adapted for preparing a polymeric material utilizing a reactor vessel in which a polymer agitator is rotatably disposed. The reactor vessel defines a horizontally-extending interior polymer processing chamber, a polymer inlet opening into the processing chamber and a polymer outlet opening from the processing chamber at a spacing from one another axially along the processing chamber, and a vapor exhaust outlet opening from the processing chamber. The polymer agitator extends axially within the processing chamber and, in accordance with the present invention, comprises an annular overflow baffle defining a central polymer overflow opening and an underflow baffle having an outer periphery defining at least one polymer underflow opening between its outer periphery and the vessel. The overflow and underflow baffles are affixed together for unitary rotation in generally parallel axially-spaced relation to one another within the processing chamber so that a portion of the flow path for the polymeric material between the polymer inlet and the polymer outlet extends through the overflow and underflow openings of the baffles. In many embodiments of the present invention, it will be preferred that at least one perforated polymer film-forming screen be disposed between the baffles to cause the polymeric material to become coated on the screen in a film-like form during rotation of the agitator to produce enhanced vapor release from the polymer as part of the polycondensation process.

In a preferred embodiment of the present reactor vessel, the interior polymer processing chamber is substantially cylindrical in configuration and the polymer inlet and outlet openings are located respectively adjacent opposite ends of the chamber. The agitator includes a plurality of the overflow and underflow baffles arranged in alternation with one another axially along the agitator and at least one screen (preferably multiple screens) disposed between each adjacent pair of the baffles, the baffles and screens being affixed together for unitary rotation in generally parallel axially-spaced relation to one another. Each annular overflow baffle has a substantially circular outer periphery disposed in rotational polymer-sealing relation to the vessel. The outer periphery of each underflow baffle is preferably formed with a plurality of circumferentially spaced recesses defining a corresponding plurality of the underflow openings. By the alternating arrangement of the overflow and underflow baffles, the agitator defines a tortuous flow path for the polymeric material extending between the polymer inlet and outlet alternately through the polymer overflow and underflow openings of the successively alternating overflow and underflow baffles, which serves to control the residence time, distribution and viscosity of the polymeric material during flow between successive overflow baffles.

Preferably, the underflow baffles and the screens have respective central openings aligned axially with the overflow openings of the overflow baffles collectively to provide a central path for enhanced vapor flow to the vapor exhaust outlet. As will be understood, viscosity of the polymer increases as the polymer progresses axially through the processing chamber between the inlet and the outlet and, in correspondence with the viscosity growth in the polymer, the screens are arranged at increasing spacings from one another and from the baffles and are also provided with increasing open area from adjacent the polymer inlet to adjacent the polymer outlet of the chamber. To assist in vapor release, the central overflow opening of each overflow baffle comprises a perforated central annulus which, like the screens, becomes coated with a film of the polymer as agitator rotation progresses to additionally induce vapor release from the polymer. For the same purposes, each underflow baffle may also be provided with a perforated central annulus.

According to one aspect of the present invention, the diametric dimension of the central overflow openings in the overflow baffles may increase from adjacent the polymer inlet to adjacent the polymer outlet so that the flow path for the polymer becomes less tortuous as the viscosity of the polymer increases.

The agitator preferably has a plurality of connecting elements extending between and affixed to the respective peripheries of the baffles and the screens, thereby serving to rigidify the agitator. Each connecting element may be configured with a trailing edge forming a wiping surface disposed radially outwardly of the agitator to apply and remove polymer to and from the interior surface of the vessel chamber during rotation of the agitator, additionally contributing to evaporative polycondensation of the polymer. Each screen is formed with peripheral slots which receive the connecting elements and define polymer drainage openings between the screens and the connecting elements.

The agitator also preferably includes a pair of structural support disks at the opposite axial ends of the agitator, each support disk having a plurality of openings extending therethrough at differing angles relative to the agitator axis. The support disk at the end of the agitator adjacent the outlet of the vessel, whereat the polymer viscosity will be greatest, is preferably provided with a plurality of blades projecting from the outward face of the support disk to wipe polymeric material from the interior surface of the chamber during agitator rotation.

To facilitate increased size and capacity of the reactor apparatus in comparison with conventional apparatus, the vessel is preferably formed with one or more passageways extending about the chamber for carrying flow of a heat exchange material in heat transfer relation with the polymeric material in the chamber for controlling the temperature of the polymeric material by heating and/or cooling as necessary or desirable. Preferably, the passageway extends annularly about the chamber with at least a portion of the passageway forming a generally helical flow path for the heat exchange material. Depending upon the particular operation and application of the apparatus, the heat exchange material may be directed through the passageway either opposite to, or in the same direction as, the polymeric material flow within the chamber. In a preferred embodiment, separate passageways may be provided for different zones along the axial extent of the vessel so that temperature control by heating and/or cooling and the direction of flow of the heat exchange material can be handled differently for the respective zones.

The present invention also provides for non-invasive sensing of the temperature of the polymeric material during processing within the chamber by means of an infrared thermal emission sensor disposed outside the processing chamber to face into the chamber through a sealed window bordering the chamber.

The reactor apparatus of the present invention also is equipped to detect the level Of polymeric material within the chamber by means of a source of radiation projected radially through the processing chamber from one side thereof and a detector at the opposite side of the chamber. A microprocessor or a like form of controller extrapolates the level of the polymer at the location of the radiation projection based on the difference between the projected and detected quantities of the radiation.

BRIEF DESCRIPTOIN OF THE DRAWIGNS

FIG. 3 is a further enlarged axial cross-sectional view taken through a portion of the reactor apparatus of FIG. 1 along lines 3—3 thereof;

FIGS. 7A–7F are vertical cross-sectional views through the agitator of FIG. 2, taken respectively along lines 7A—7A through 7F—7F thereof, showing the differing underflow baffles in front elevation;

DETAILED DESCRIPTOIN OF THE PREFERRED EMBODIMENT

Figure 1:
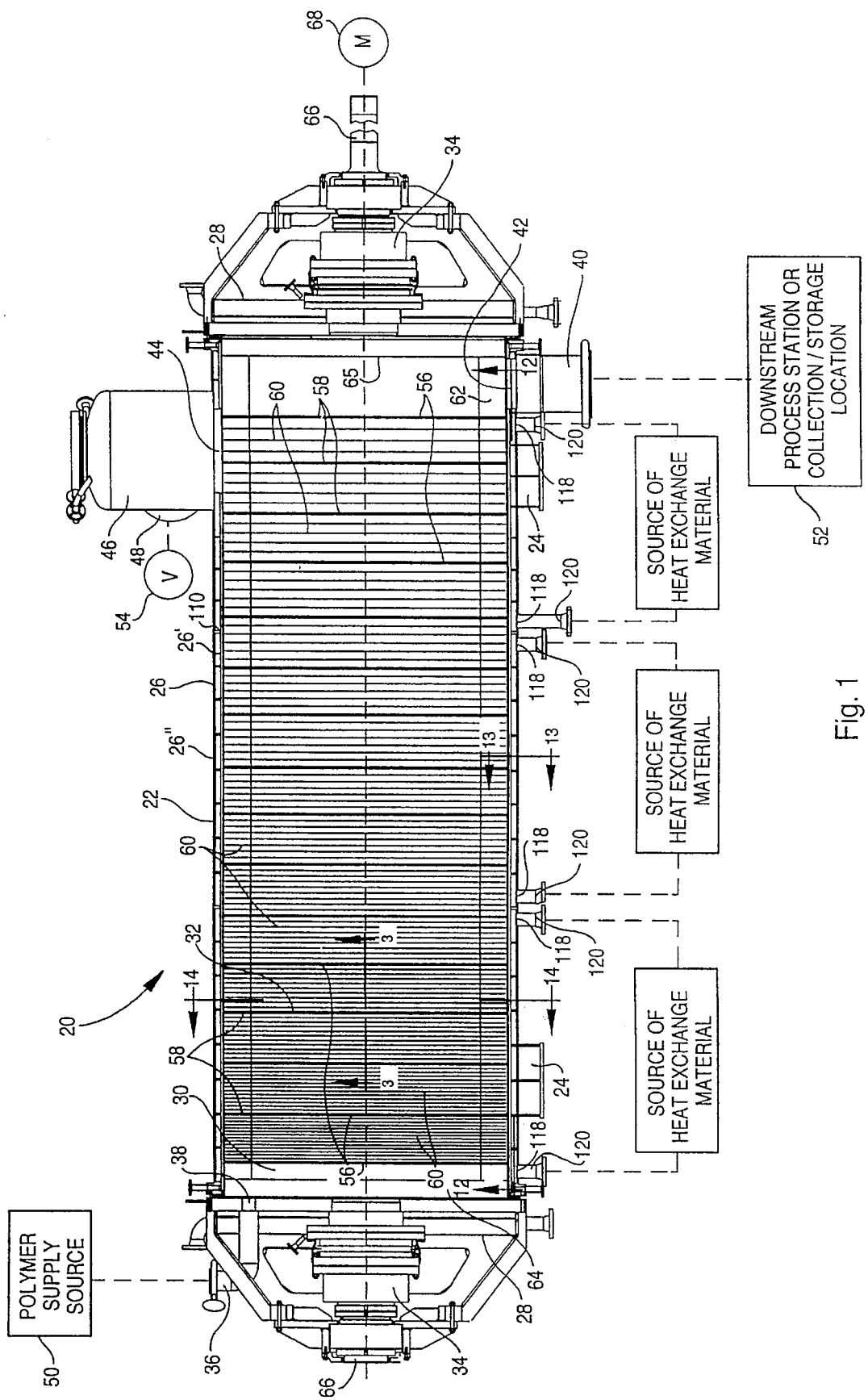
FIG. 1 is a side elevational view, partially in vertical cross-section, of the reactor apparatus of the present invention according to one preferred embodiment thereof.

Referring now to the accompanying drawings and initially to FIG. 1, a reactor apparatus in accordance with one preferred embodiment of the present invention is generally indicated in its totality at 20. The reactor apparatus 20 basically comprises a substantially cylindrical elongate vessel 22 supported in a horizontally extending disposition by stanchions 24 mounted adjacent opposite axial ends of the vessel 22. The vessel 22 is formed by a dual-walled cylindrical shell 26 sealably enclosed at its opposite axial ends by respective end covers 28 to collectively define a correspondingly cylindrical interior processing chamber 30 within which a cage-like agitator 32 is rotatably supported by bearing assemblies 34 mounted to the opposite end covers 28 to extend axially through substantially the entire length of the chamber 30.

A polymer input conduit 36 is mounted exteriorly to one end cover 28 annularly about an inlet opening 38 formed through the cover 28 adjacent the upwardly facing side thereof to communicate with the corresponding end of the interior processing chamber 30. A relatively larger tubular polymer output fitting 40 is affixed to the shell 26 of the vessel 22 at its downwardly facing side adjacent the opposite end of the chamber 30 annularly about an outlet opening 42 formed through the shell 26 into the processing chamber 30. A vapor exhaust opening 44 is similarly formed through the shell 26 at its upwardly facing side and opens into a bell-shaped vapor collection housing 46 mounted exteriorly to the shell 26 about the opening 44. An exhaust conduit 48 extends laterally from the vapor collection housing 46 in interior communication therewith.

As more fully explained hereinafter, the polymer inlet conduit 36 is connected through a suitable conduit structure (not shown) with a source of a low viscosity polymer such as, by way of example but without limitation, polyester, as indicated only representatively at 50, to provide a continuous delivery of the process polymer into the adjacent end of the chamber 30. Relatively higher viscosity polymer produced by operation of the present reactor apparatus 20 as hereinafter describes is continuously discharged at a corresponding rate from the opposite end of the chamber 30 downwardly through the output fitting 40 for delivery to a downstream processing station or a suitable collection and storage location, only representatively indicated at 52. The exhaust conduit 48 is connected to a suitable vacuum source 54 to progressively withdraw evaporative vapors resulting from the polycondensation process induced within the processing chamber 30.

Figure 2:
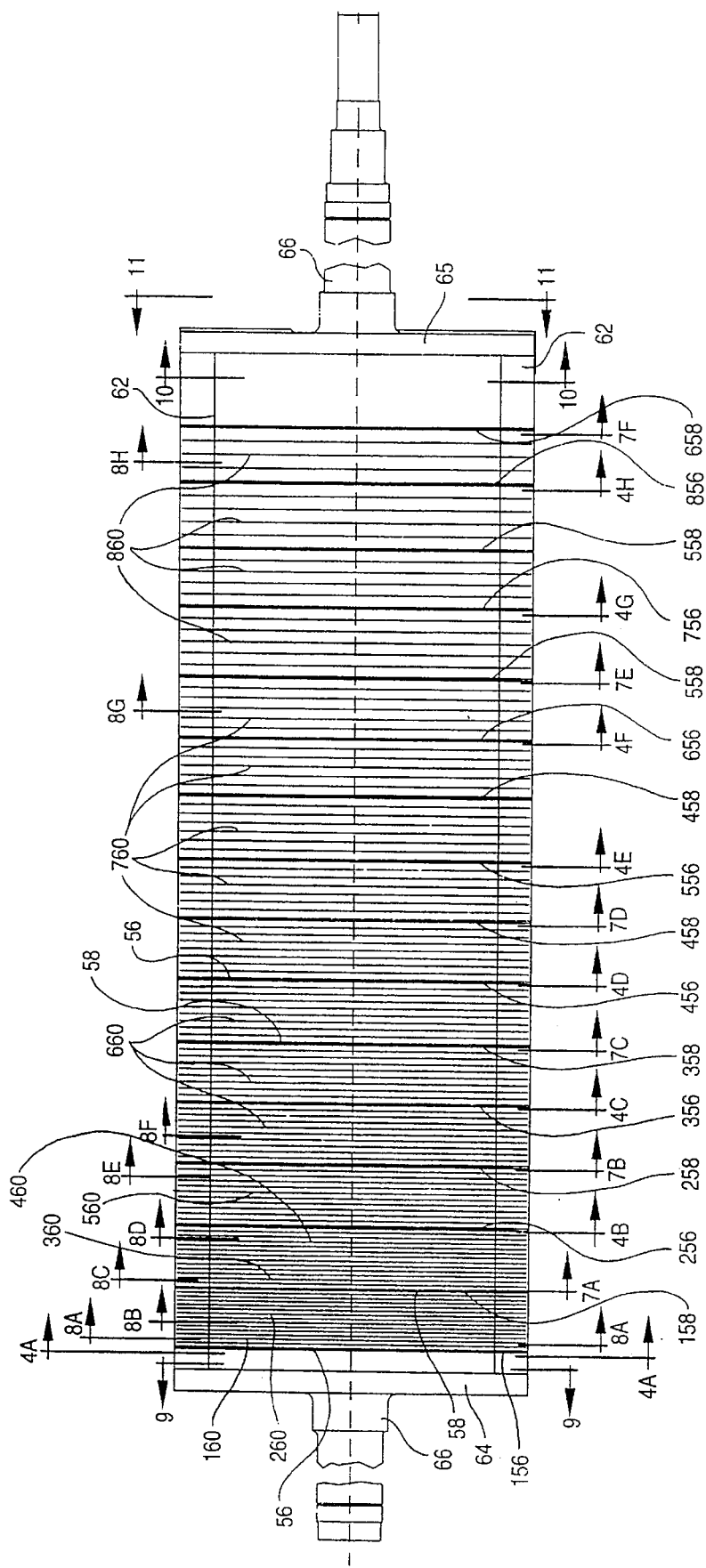
FIG. 2 is a slightly enlarged side elevational view of the polymer agitator of the reactor apparatus of FIG. 1.
Figure 4A:
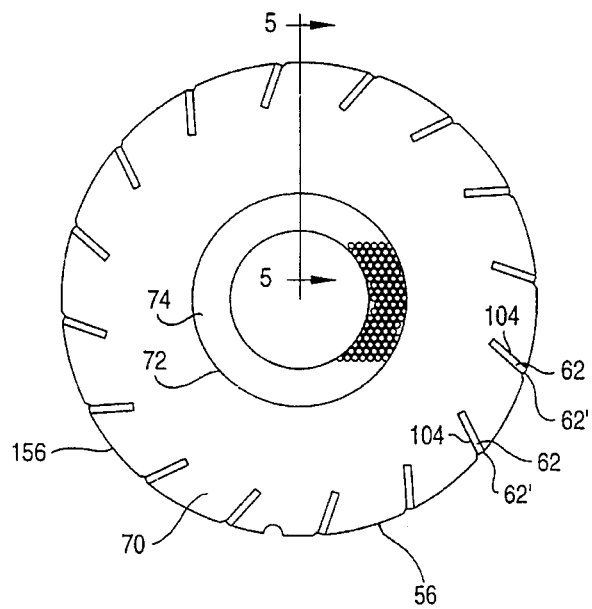
FIGS. 4A–4H are vertical cross-sectional views of the agitator taken respectively along lines 4A—4A through 4H—4H of FIG. 2, showing the differing overflow baffles of the agitator in front elevation.
Figure 4B:
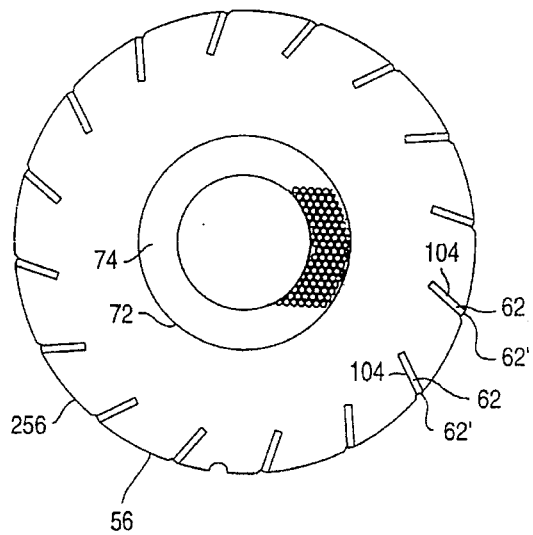
Figure 4C:
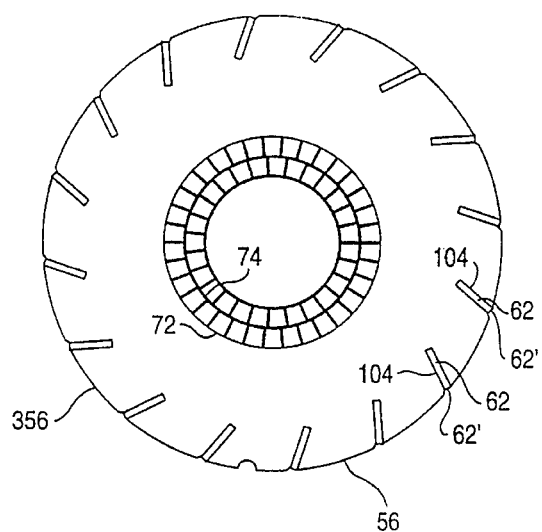
Figure 4D:
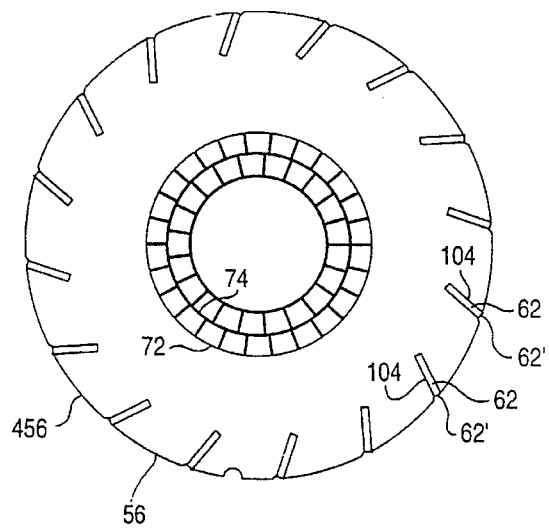
Figure 4E:
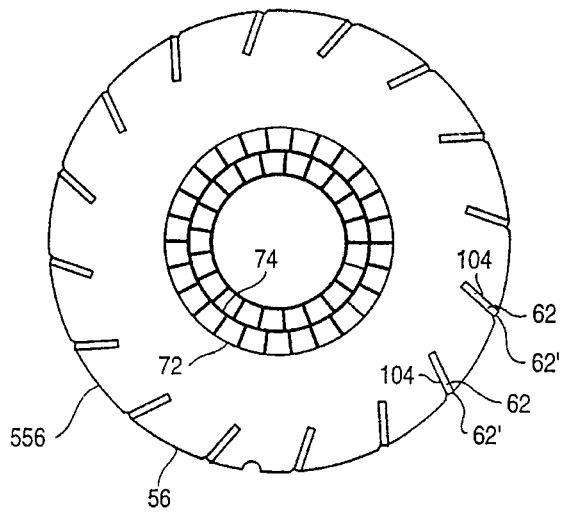
Figure 4F:
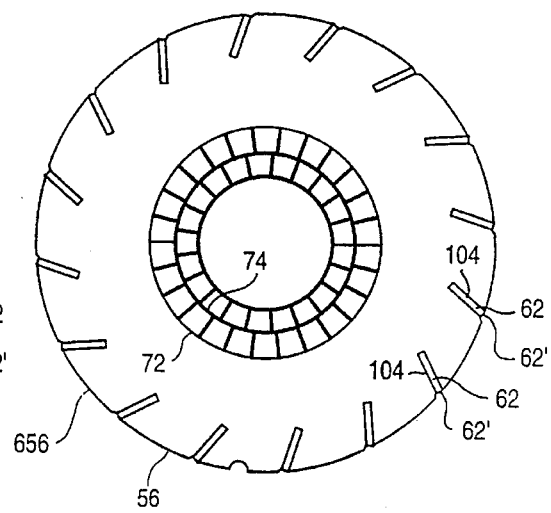
Figure 4G:
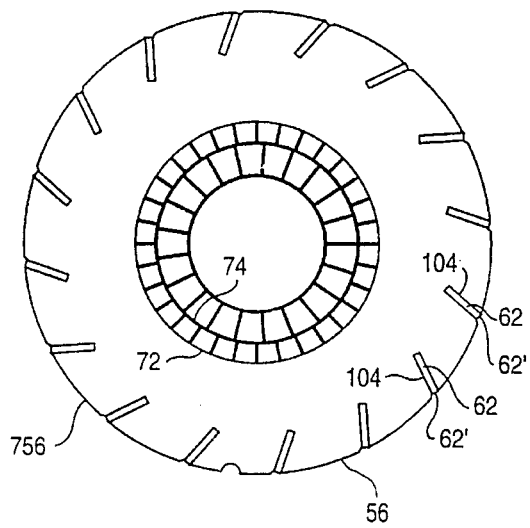
Figure 4H:
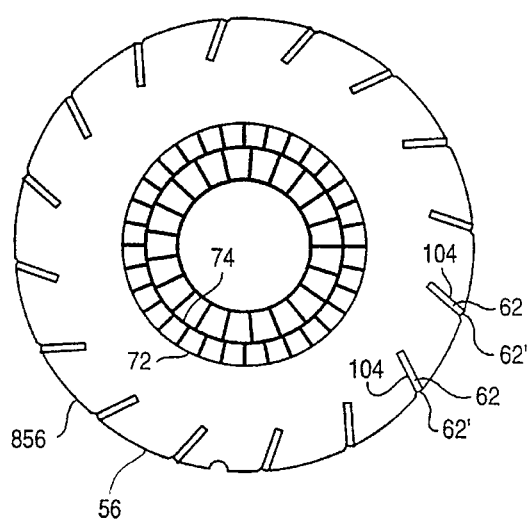

With additional reference to FIG. 2, the agitator 32 is formed of a pair of opposing end plates 64,65 and an intervening series of annular polymer overflow and underflow solid baffles 56,58 and annular polymer film-forming screens 60 connected in spaced parallel relation integrally with one another at their respective peripheries by a series of axially-extending polymer wiping bars 62 fixed respectively to the end plates 64,65 overflow and underflow baffles 56,58 and screens 60 at equal circumferential spacings thereabout. A central axial support shaft 66 extends outwardly from each end plate 64,65 for supporting the agitator 32 within the bearing assemblies 34, the shaft 66 projecting from the end plate 65 at the outlet end of the vessel 22 being of an elongated length to extend beyond the corresponding bearing assembly 34 for driving connection of the agitator 32 to a suitable drive motor, indicated only representatively at 68.

The overflow and underflow baffles 56,58 are arranged in alternation with one another along the entire length of the agitator 32, with an overflow baffle 56 disposed immediately adjacent the end plate 64 at the inlet end of the vessel 22 and with an underflow baffle 58 disposed immediately adjacent the end plate 65 at the outlet end of the vessel 22. Multiple screens 60 in differing numbers are disposed between each adjacent pair of the baffles 56,58.

Figure 5:
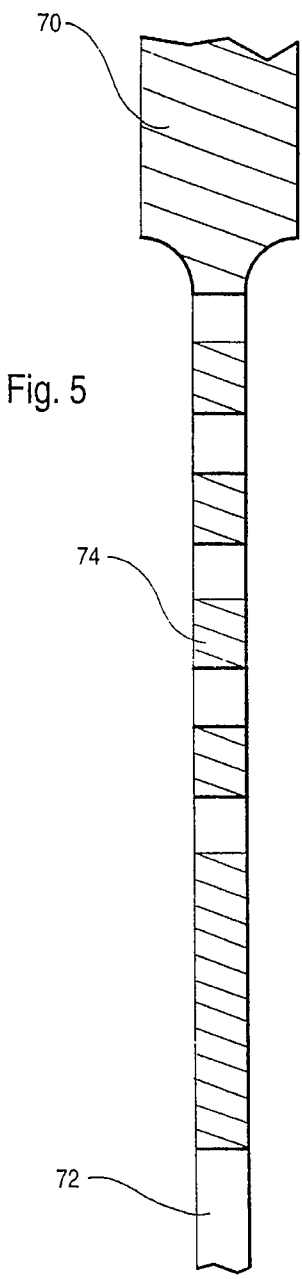
FIG. 5 is a radial cross-sectional view of a central portion of the overflow baffle of FIG. 4A, taken along line 5—5 thereof.

As seen in FIGS. 3 and 4A–4H, each overflow baffle 56 is formed of an imperforate main plate-like annular body 70 having a circular outer periphery and defining a concentric circular central opening 72 into which an annular perforated screen element 74 of relatively reduced thickness projects coplanarly with the main annular body 70. (See also FIG. 5.) With reference to FIGS. 7A–7F, each underflow baffle 58 is similarly formed of a main plate-like annular body 76 defining a central circular opening 78 into which extends an annular perforated screen element 80, but with the circular outer periphery of the body 76 formed with a series of arcuate recesses 82 circumferentially spaced about the body 76. The outer diameter of the respective annular bodies 70,76 of the overflow and underflow baffles 56,58 is selected to closely approach the inner diameter of the vessel shell 26 within relatively fine predetermined tolerances, so that the overflow baffles 56 effectively form a polymer seal relative to the interior cylindrical wall of the shell 26. As will thus be understood, the alternating arrangement of the overflow and underflow baffles 56,58 cause polymer to follow a tortuous flow path alternately over the annular body 70 and through the central opening 72 of each overflow baffle 56 and under the annular body 76 and through the underflow openings formed by the arcuate recesses 82 of each intervening underflow baffle 58.

Basically, it will be recognized that the spacing between each overflow baffle 56 and the next succeeding overflow baffle 56 essentially divides the overall chamber 30 within the vessel 22 into a series of generally distinct compartments in which the polymer is transiently contained as it flows through the chamber 30 in sequence from one such compartment to the next through the succeeding overflow openings 72. This serial compartmentalized containment of the polymer enables the residence time of the polymer within each succeeding compartment to be relatively closely controlled, which in turn enables control of the overall distribution of the polymer along the length of the chamber 30 and a relatively close control of the viscosity growth in the polymer among the serial compartments. As such, the tortuous over-under polymer flow control accomplished by the baffles 56,58 promotes a plug-type flow of the polymer with minimized backflow of polymer into preceding compartments.

Of course, as those persons skilled in the art will recognize, the particular dimensioning and configuration of the overflow and underflow baffles 56,58, particularly the diameter of the central openings 72 of the overflow baffles 56 and the shape and size of the underflow recesses 82 of the underflow baffles 58, together with the relative spacing of the baffles 56,58, may be selectively varied from one reactor to another and also within a given reactor as necessary or desirable to induce the polymer to flow in any of various forms of tortuous paths alternately over and under the respective baffles in order to accomplish relatively fine control of the residence time, distribution and viscosity growth of the polymeric material during flow between each overflow baffle and the next succeeding overflow baffle.

By way of example and without limitation, the particular embodiment of the reactor apparatus 20 illustrated in the drawings utilizes an arrangement of eight overflow baffles 56 alternating with eight underflow baffles 58, beginning with a first overflow baffle 56 at a short spacing from the end plate 64 at the inlet end of the chamber 30 and ending with an underflow baffle 58 spaced from the end plate 65 at the outlet end of the chamber 30 by a sufficient dimension to dispose the last underflow baffle 58 in advance of the bottom outlet opening 42 in the vessel 22. The overflow and underflow baffles 56,58 are spaced equally from one another along the length of the chamber 30 and, according to this particular embodiment, the diametric dimension of the central openings 72 in the overflow baffles 56 increases with each succeeding overflow baffle 56, whereas, in contrast, the diameter of the central openings 78 in the underflow baffles 58 as well as the size, shape, number and spacing of the underflow recesses 82 in the underflow baffles 58 are constant among the succeeding underflow baffles 58, all as will be readily recognized from the illustration of the individual respective overflow baffles 156,256,256,356, et seq, shown in FIGS. 4A–4H and the individual respective underflow baffles 158,258,358, et seq, shown in FIGS. 7A–7F. As will be understood, this particular dimensioning and arrangement of the overflow and underflow baffles 56,58 causes the flow path of the polymer to become gradually less tortuous with the correspondingly gradual increase in the viscosity of the polymer as it progresses along the length of the chamber 30.

In the particular illustrated embodiment, it will also be recognized that the screens 60 are arranged at gradually increasing spacings to one another with progressively fewer screens 60 disposed between each adjacent pair of the overflow and underflow baffles 56,58, along the length of the chamber 30 from its inlet end to its outlet end. In addition, as shown by the illustrations of the individual respective screens 160,260,360, et seq., in FIGS. 8A–8H, the screens vary in construction, the form of perforated openings therein, and the resultant opening ratio (i.e., the amount of total open area defined by the perforated openings in each screen relative to the overall area occupied by the screen). Basically, the screens 60 are arranged to increase in spacing from one another and in the total open area defined by each individual screen 60 from the inlet end to the outlet end of the chamber 30 in correspondence with and relation to the viscosity growth of the polymer from one baffled compartment to the next succeeding baffled compartment along the agitator 32.

Specifically, for example, the screens 160,260,360,460 disposed in the first baffled compartment between the overflow baffles 156,256 are each formed of a plate-like flat planar body 84 having a plurality of closely spaced circular bores 86 drilled axially through the body 84 over substantially its entire surface area, the size of the bores 86 increasing while the number of bores 86 per screen decreases from the screens 160 to the screens 460. See FIGS. 8A–8D. The screens 560 disposed between the overflow baffle 256 and the next succeeding adjacent underflow baffle 258 are formed as a grid of wires 88 welded to one another in equally-spaced, perpendicularly-intersecting relation to define a plurality of square perforated openings 90 arranged in linear perpendicular rows. See FIG. 8E. The remaining screens 660,760,860 are also constructed of a grid of wires, but in the form of a series of circular wires 92 of increasing diameters connected in concentric coplanar relation by a series of linear wires 94 welded radially between the circular wires 92 at equal circumferential spacings thereabout, to define somewhat trapezoidal-like openings 96 which are considerably larger than the square openings 90 of the screens 560.

As will be understood, the screens 60 function during operation of the reactor apparatus 20 to become continuously coated with a film of the polymeric material as the agitator 32 rotates the screens 60 through the mass of polymeric material contained within each baffled compartment and thereby, as the coated portions of the screens 60 rotate through the upper regions of the chamber 30, the film coating of polymer on each screen 60 is fully exposed to promote evaporation of volatiles from the polymer. In order to maximize this evaporative polycondensation action, it is important that the screens 60 hold the polymer coating in a film-like form, which will be understood to be a function of the viscosity of the polymer and the particular construction of each individual screen. That is, with a polymer of relatively high viscosity, the viscous character of the polymer enables it to bridge larger perforations while remaining in a film-like form than with a lower viscosity polymer. Hence, the indicated construction and arrangement of the screens 160,260,360, et seq., is selected so that the respective opening ratios of the screens increase progressively from the inlet end to the outlet end of the chamber 30 in relation to the viscosity growth in the polymer realized from one baffled compartment to the next.

It is also desirable, in order to maximize the total evaporation of volatiles accomplished within the chamber 30, that the screens 60 be spaced as closely as possible to one another without causing polymer films on adjacent screens 60 to bridge from one screen to the next, which will be understood to be a function of polymer viscosity and the attendant surface tension of the polymer. Thus, as indicated, the screens 60 are most closely spaced to one another at the end of the agitator 32 within the inlet end of the chamber 30, with the spacing between the screens 60 gradually increasing along the length of the agitator 32 toward the outlet end of the chamber 30. See FIGS. 1 and 2.

As previously indicated, each of the overflow and underflow baffles 56,58 have a central perforated screen annulus 74,80 within their respective central openings 72,78, which will be understood to function in the same manner as the adjacent screens 60 to become coated with a film of polymer to enhance evaporation of volatiles from the polymer. As with the screens 60, the particular construction of each screen annulus 74,80 varies to provide the screens 74,80 with progressively increasing open area from the inlet end to the outlet end of the chamber 30 in relation to the corresponding viscosity growth in the polymer along the length of the chamber 30. Thus, the particular construction of the screen annuli 74,80 for each respective overflow and underflow baffle 56,58 corresponds to that of the adjacent screens 160,260, et seq. Hence, as depicted in FIGS. 4A–4H, the screen annuli 74 of the overflow baffles 156,256 are in the form of a flat plate-like body drilled axially over substantially its entire surface area with a plurality of closely-spaced circular bores, while the remaining overflow baffles 356, 456, et seq., have screen annuli 74 in the form of a wire grid of concentric circular wires welded with radial connecting wires. The first underflow baffle 158 similarly has a plate-like screen annulus 80 drilled with closely-spaced circular bores and the second underflow baffle 258 has a screen annulus 80 formed of a wire grid of perpendicularly welded linear wires defining square perforated openings, while the remaining underflow baffles 358,458, et seq., have a wire grid annulus 80 of concentric circular wires welded with radial connecting wires, as shown in FIGS. 7A–7F.

Figure 9:
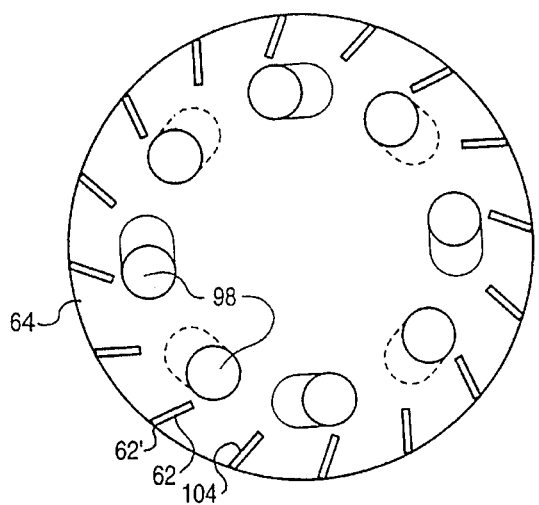
FIG. 9 is a vertical cross-sectional view through the agitator of FIG. 2, taken along line 9—9 thereof, showing in front elevation the inward face of the inlet end plate of the agitator.
Figure 10:
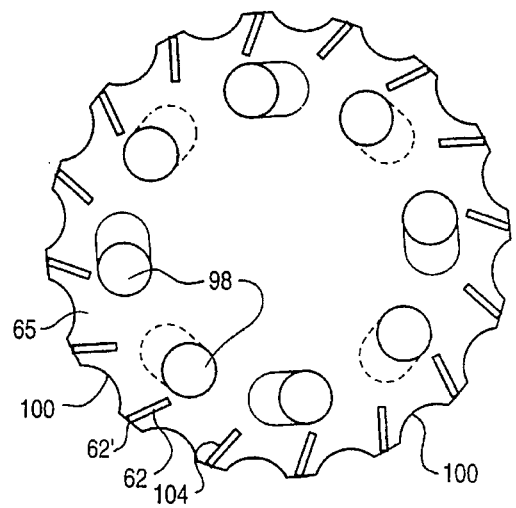
FIG. 10 is a vertical cross-sectional view through the agitator of FIG. 2, taken along line 10—10 thereof, showing in front elevation the inward face of the outlet end plate of the agitator.
Figure 11:
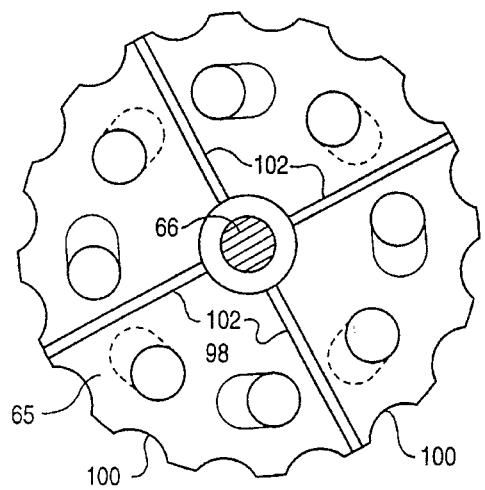
FIG. 11 is a vertical cross-sectional view taken through the agitator of FIG. 2 along line 11—11 thereof, showing in front elevation the outward face of the outlet end plate of the agitator.

As best seen in FIGS. 9–11, the end plates 64,65 of the agitator 32 are formed as circular planar disks of relatively greater thickness than the baffles 56,58 and without any central opening, to serve as structural support members for the opposite ends of the agitator 32. Each end plate 64,65 is formed with a plurality of polymer flow openings 98 located in a circular arrangement at equal circumferential spacings concentrically about the axis of the end plate 64, with alternate ones of the openings 98 being formed angularly through the body of the end plate 64,65 in one angular direction relative to the axis of the plate and the intermediate openings 98 being similarly formed angularly through the plate body in the opposite angular direction to the plate axis. The angular orientation of the openings 98 enables the end plates 64,65 to effectively "pump" polymer through the openings 98. The outer periphery of the end plate 65 at the outlet end of the chamber 30 is formed with a plurality of shallow arcuate recesses 100 to function as polymer underflow openings in the same manner as the peripheral underflow recesses 82 of the underflow baffles 58. See FIGS. 10 and 11. In addition, as seen in FIG. 11, the outward end face of the outlet end plate 65 is formed with plural radial vanes 102 to serve as polymer wiping blades to progressively wipe polymer from the adjacent facing interior surface of the outlet end cover 28.

As will be seen in FIGS. 1–10, each of the polymer wiping bars 62 is an elongate linear bar of rectangular cross-section which mounts in corresponding rectangular recesses formed in alignment with one another respectively in the outer peripheries of the overflow baffles 56, underflow baffles 58, screens 60, and end plates 64,65 in a trailing angular relation to the axis of the agitator 32 relative to its direction of rotation. The wiping bars 62 are contained within the respective butt welds 104 in the overflow baffles 56, underflow baffles 58, and end plates 64,65 so that the respective radially outermost edge of each bar 62 is disposed substantially precisely in alignment with the respective outer peripheries of the baffles and end plates. The screens 60, however, are of a slightly lesser outer diameter than the baffles 56,58 and the end plates 64,65, whereby the radially outermost edges of the wiping bars 62 project slightly beyond the outer peripheries of the screens 60. Preferably, the wiping bars 62 are affixed to the overflow and underflow baffles 56,58 and to the end plates 64,65 by continuous welds formed along the entirety of the respective butt welds 104 therein, but within the recesses 104 formed in the screens 60, the wiping bars 62 are welded only at the radially outward ends of such welds 104, the radially inwardmost extends of such welds 104 in the screens 60 being laterally enlarged to produce a spacing between the wiping bars 62 and the body of the respective screens 60 to promote drainage of polymer for better film formation and to reduce any tendency of polymer to collect and stagnate in such areas.

In this manner, the wiping bars 62 present a trailing wiper edge 62' which functions as the agitator 32 rotates to progressively and continuously withdraw polymer from the bottom region of the chamber 30 and, in a wiping-like manner, apply the polymer to the interior cylindrical wall of the chamber 30 while removing excess polymer so as to maintain a film of the polymer over substantially the entirety of the cylindrical interior wall of the chamber. The film formation of the polymer accomplished by this progressive wiping action serves to further maximize the surface area of the polymer exposed to evaporative action to assist the screens 60,74,80 in promoting maximized polycondensation of the polymer.

Figure 6:
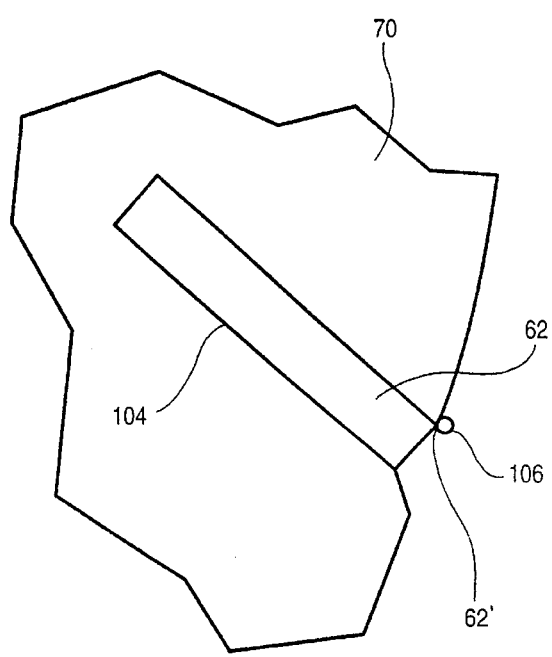
FIG. 6 is an enlarged front elevational view of a peripheral portion of the overflow baffle of FIG. 4A at the connection therewith of one of the polymer wiping bars.
Figure 7A:
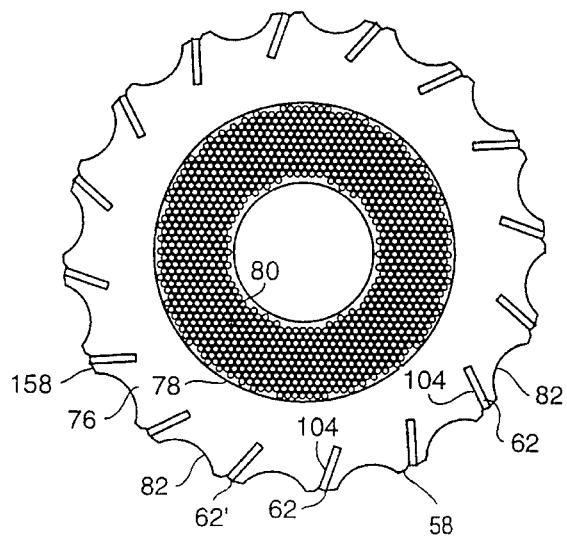
Figure 7B:
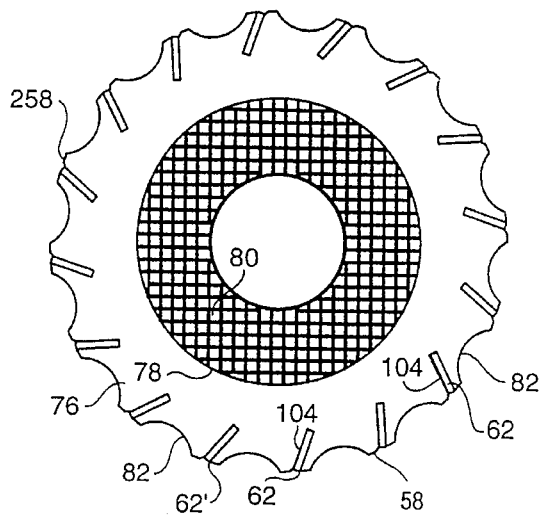
Figure 7C:
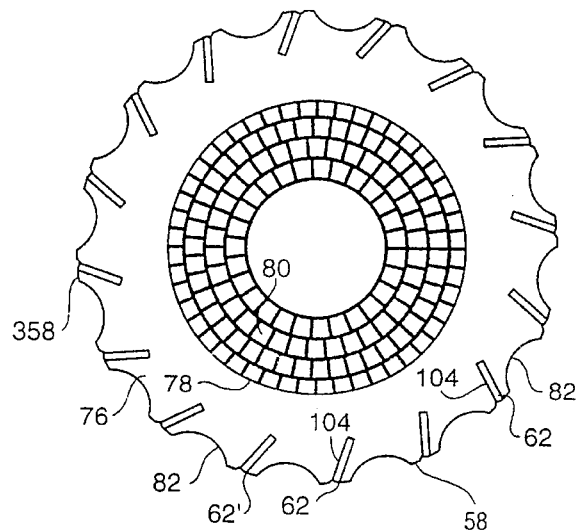
Figure 7D:
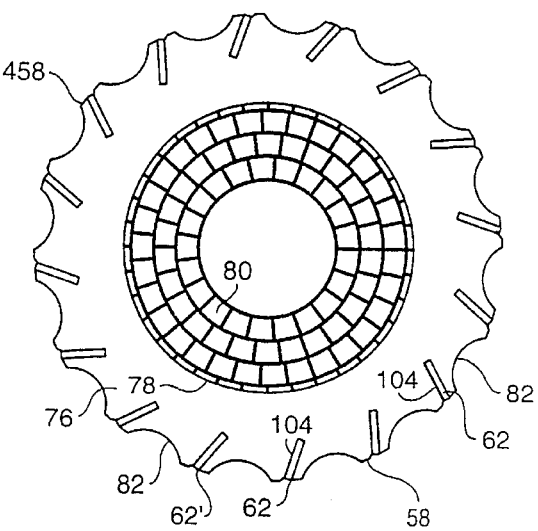
Figure 8A:
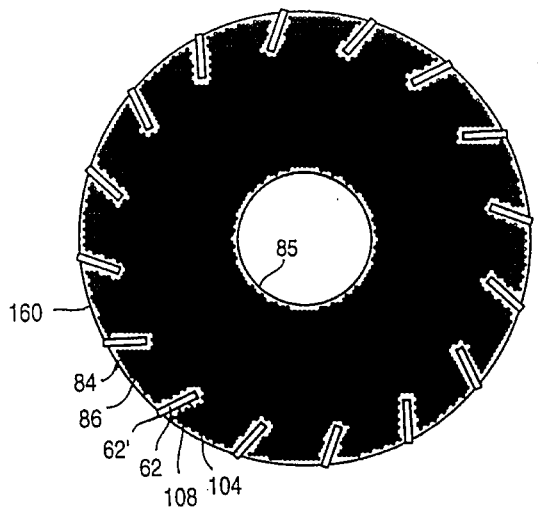
FIGS. 8A–8H are vertical cross-sectional views through the agitator of FIG. 2, taken respectively along lines 8A—8A through 8H—8H thereof, showing the differing film-forming screens in front elevation.
Figure 8B:
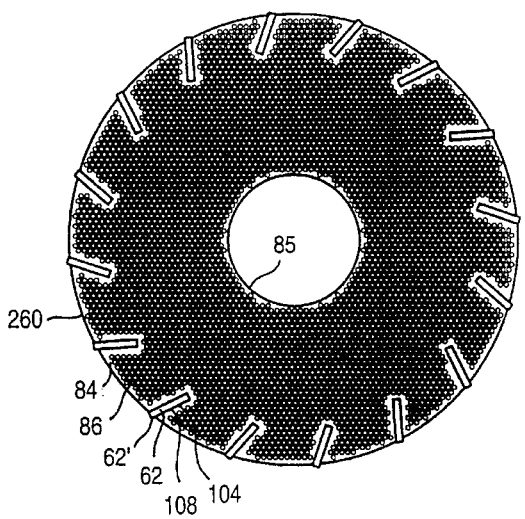
Figure 8C:
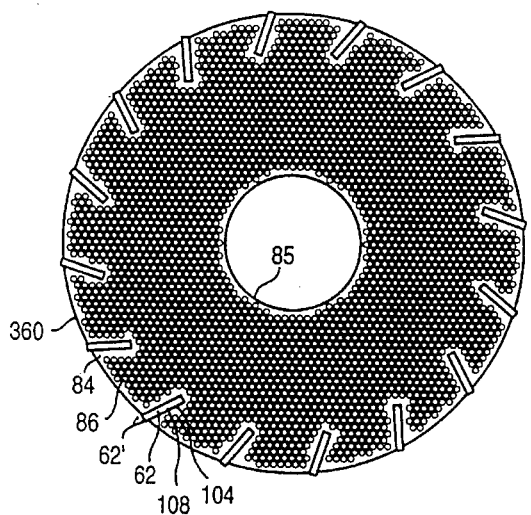
Figure 8D:
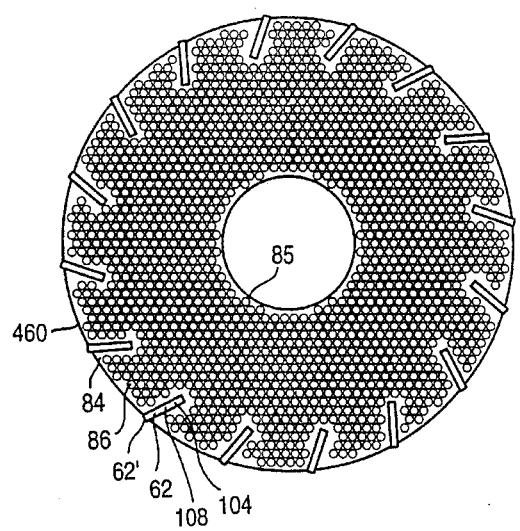
Figure 8E:
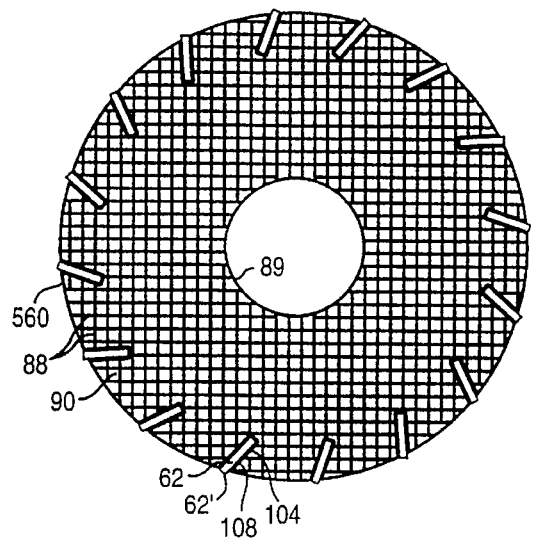
Figure 8F:
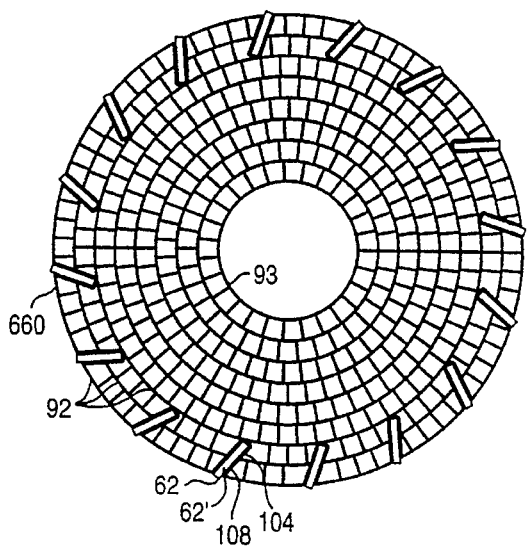
Figure 8G:
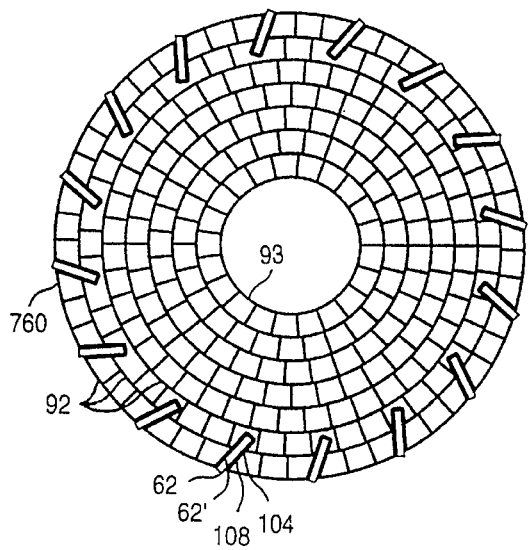
Figure 8H:
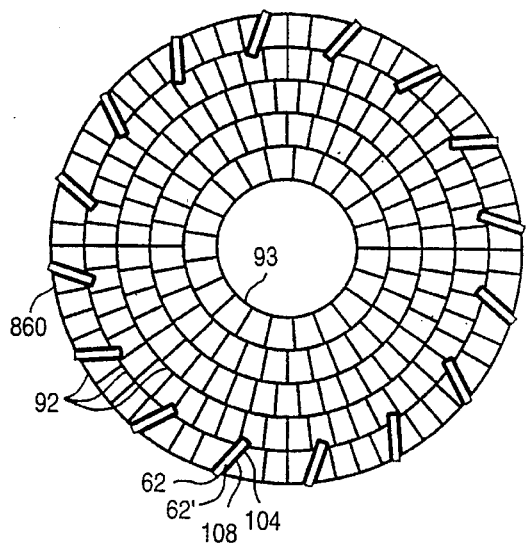

To further enhance the wiping action of the bars 62, it is additionally preferred that selected ones of the bars 62 have a rod 106 welded to the outward wiper edge 62' along substantially the entire length of each selected wiper bar 62 to project slightly outwardly into relatively closer proximity to the interior wall of the chamber 30 than the other wiping bars 62, as shown in FIG. 6. The rod 106 is preferably formed of a metal which is relatively softer than that from which the vessel shell structure 26 is fabricated, e.g., nickel, so that any unintended contact occurring between the rods 106 and the interior wall of the chamber 30 will deform only the rod 106 without scoring or otherwise defacing the interior chamber wall.

Notably, the wiping bars 62 integrate the respective end plates 64,65, baffles 56,58, and screens 60 of the agitator 32 without the necessity of providing a central axial shaft as is common in conventional polymer polycondensation reactors. Advantageously, the absence of the central shaft eliminates risk of potential accumulation of polymer thereon and resultant possible contamination of the polymer within the chamber 30. In addition, the absence of the central shaft in conjunction with the aligned central openings in the baffles 56,58 and in the screens 60 provides a relatively large axial open area extending centrally along the length of the agitator 32 through which evaporating volatiles from the polymer can flow relatively unimpeded to the exhaust opening 44. Toward this end, the central portions of the openings defined by the screen annuli 74,80 in the baffles 56,58 and the central opening defined by the annular screens 60 are coaxially aligned and of substantially identical inner diameters in the preferred embodiment as illustrated, with only the outer diameters of the screen annuli 74 of the overflow baffles 56 (and in turn the respective diameters of the central openings 72 therein) varying along the length of the agitator 32.

As aforementioned, the shell 26 of the reactor vessel 22 is of a dual-walled construction, generally depicted in FIG. 1, having an inner cylindrical wall 26' defining the processing chamber 30 and an outer cylindrical jacket 26" of slightly greater diameter supported in concentric relation about the inner wall 26' by jacket supporting bars 110 welded thereto to extend radially therebetween. Advantageously, the annular space thereby created between the inner wall 26' and the outer jacket 26" of the vessel shell 26 provides the capability of conveying a heat exchange material by which excess heat from the polymer may be extracted to cool the polymer or, alternatively, the polymer may be supplementarily heated, or both.

Figure 12:
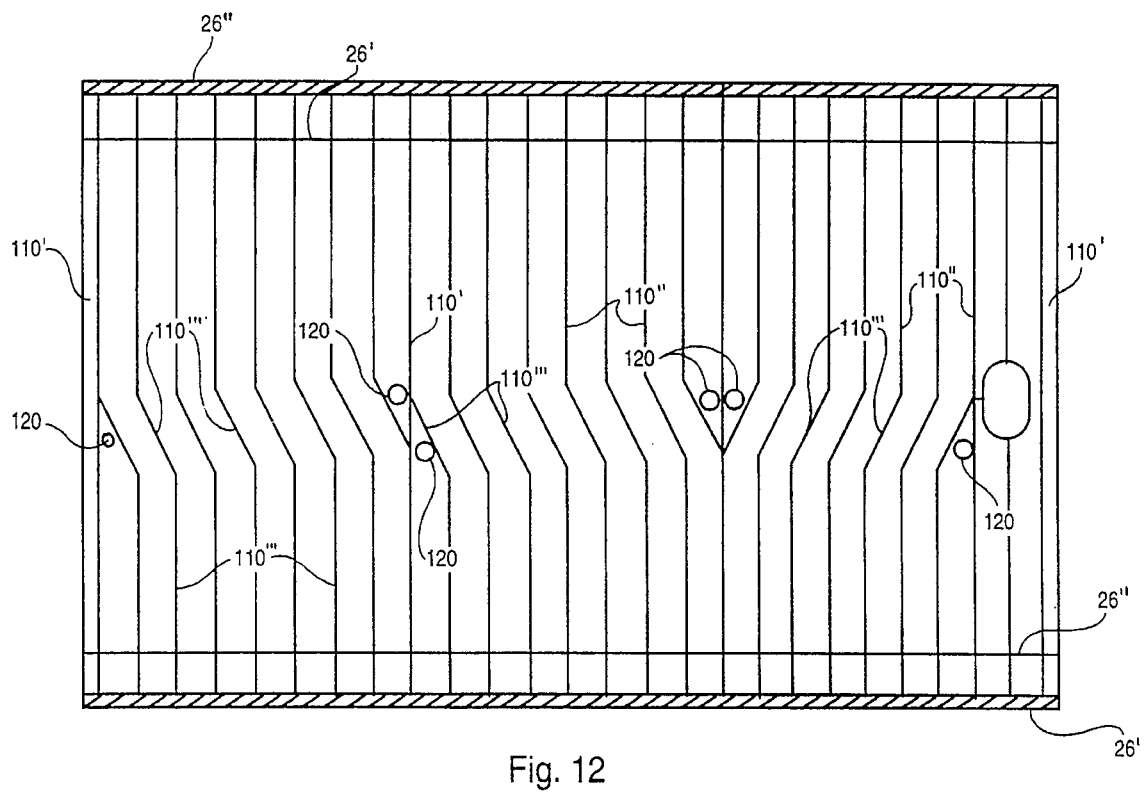
FIG. 12 is a horizontal cross-sectional view taken through the vessel of the reactor apparatus of FIG. 1 along line 12—12 thereof, showing the heat exchange zones defined within the shell of the vessel.

In particular, by way of example but without limitation, FIG. 12 illustrates one preferred arrangement of the jacket supporting bars 110 to define three separate annular heat exchange zones 112,114,116 serially arranged along the length of the vessel 22 defined between axially-spaced parallel jacket supporting bars 110' in the form of imperforate zone-dividing walls extending radially between the inner wall 26' and the outer jacket 26" at the axial boundaries of the heat exchange zones. Within each heat exchange zone 112,114,116, a series of jacket supporting bars 110" are arranged in spaced parallel relation to serve as flow control walls, each formed with a circumferential opening 118 at which flow diversion walls 110''' extend angularly between adjacent flow control walls 110".

In this manner, the flow control walls 110" in conjunction with the flow diversion walls 110''' define a continuous flow path for heat exchange material extending annularly in an essentially spiral manner from one axial end of each heat exchange zone to the other axial end thereof. Inlet and outlet nozzle-like conduits 120 are affixed to the outer jacket 26" of the vessel shell 26 at the respective opposite axial ends of each heat exchange zone 112,114,116 to open into the opposite ends of the flow path defined therein, for conveying heat exchange material into, and removing heat exchange material from, each zone.

As will be understood by persons skilled in the art, the actual direction of flow of heat exchange material within each zone 112,114,116 may be selected to accomplish overall heat exchange flow either in the same direction as, or opposite to, the direction of polymer flow within the vessel 22, depending upon whether and the extent to which it is desired to heat or cool the polymer within the adjacent region of the interior processing chamber 30. For example, inasmuch as the relatively low viscosity polymer entering the inlet end of the chamber 30 through the inlet opening 38 will typically be of a lower temperature than the polymer already under process within the chamber 30, it may be desirable to circulate heat exchange material of a relatively elevated temperature within the adjacent heat exchange zone 112 to flow annularly and spirally about the chamber 30 in the same overall direction as the polymer flows within the chamber 30 in order to induce more rapid heating of the polymer to its desired processing temperature, whereas in contrast it would be desirable typically to convey a relatively cooler heat exchange material through the last heat exchange zone 116 adjacent the outlet end of the vessel in an overall spiral direction counter to the direction of polymer flow within the vessel in order to cool the polymer within the adjacent region of the chamber 30 so as to prevent possible overheating and degradation of the polymer. Within the intermediate heat exchange zone 114, heat exchange flow may occur in either direction as heating or cooling of the polymer may be necessitated by the particular process conditions.

As will be understood by persons skilled in the art, substantially any suitable heat exchange material may be utilized for conveyance through the respective heat exchange zones, one particularly preferred material being a phenol-based material having a high boiling point such as the heat exchange liquid marketed under the trademark DOWTHERM by Dow Chemical Corporation.

Advantageously, the polymer temperature control accomplished by selective operation of the heat exchange zones 112,114,116, in conjunction with the novel structure of the agitator 32 as described above, enables the vessel 22 of the present reactor apparatus to be fabricated to a substantially larger diameter and greater length than has conventionally been practicable to accomplish in known polycondensation reactors, whereby the overall processing capacity of the present reactor is substantially greater than with known conventional reactors.

Basically, the size limitations in existing reactors result from a combination of several factors. In order to accomplish an overall increase in process capacity, it is necessary or at least desirable to maintain the rotary speed of the agitator essentially the same as the size of the vessel and the agitator increases, but the corresponding increase in power required to drive an agitator of increased size necessarily tends to generate heat within the polymer being processed to a correspondingly greater degree, thereby posing problems of excess heating and degradation of the polymer. The occurrence of stagnant areas within the polymer processing chamber and attendant problems of achieving uniformity in polymer viscosity and preventing polymer contamination can be exacerbated with an increase in vessel size.

Accordingly, in contrast to conventional reactors wherein significant increases in reactor capacity have been difficult or impossible to achieve without potentially compromising polymer quality, the present reactor apparatus may be constructed to a substantially greater size and process capacity than conventional reactors while at the same time actually enabling improvements in polymer quality to be achieved. The novel construction of the agitator without a central shaft minimizes risk of polymer contamination due to stagnant areas within the polymer, enables the film-forming screens to be supported in more closely spaced relation to one another than in agitators utilizing a central shaft thereby to maximize evaporation of volatiles within a given chamber volume, and also promotes freer flow and more rapid exhaust of evaporative vapors from the process chamber. The construction of the agitator also allows closer tolerances to be maintained between the periphery of the agitator and the interior cylindrical wall of the vessel 22, particularly between the vessel wall and the wiper bars 62, to promote a multiple polymer wiping action upon each revolution of the agitator, providing the dual benefit of promoting more rapid release of volatiles as well as heat from the polymer, and also minimizing the extent of unwiped surfaces within the vessel. The relatively fine temperature control permitted by the dual-walled construction of the vessel shell 26 with multiple distinct heat exchange zones promotes a more rapid extraction of excess heat from the polymer attendant to the larger capacity of the apparatus and thereby ensures that the quality improvements achieved by the novel agitator construction are not deleteriously offset by polymer degradation due to overheating.

Figure 13:
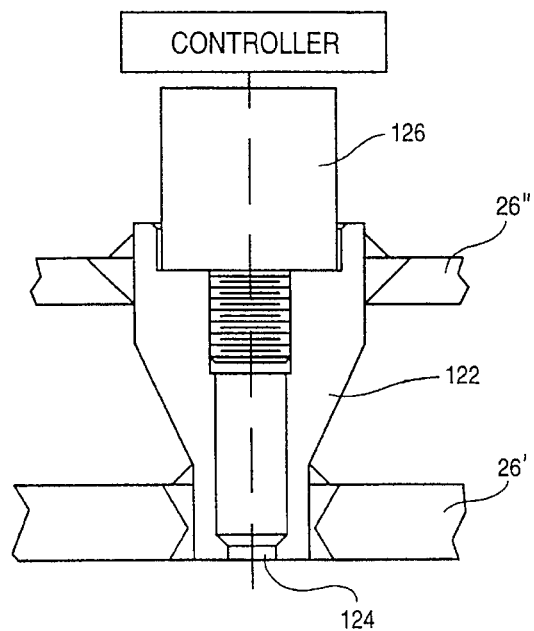
FIG. 13 is a vertical cross-sectional view taken through a portion of the vessel of the reactor apparatus of FIG. 1 along line 13—13 thereof, showing one polymer temperature sensor of the apparatus.

To assist further in the control of polymer temperature within the processing chamber 30 of the present apparatus 20, non-invasive temperature sensors are mounted to the underside of the vessel shell 26 at each heat exchange zone 112,114,116 to enable direct measurement of polymer temperature within each zone without any structural intrusion into the process chamber 30. As best seen in FIG. 13, at each temperature sensing location along the vessel 22, an annular mounting hub 122 is affixed to extend between the inner wall 26' and the outer jacket 26" of the vessel shell 26 to receive and support a temperature sensor 126, preferably in the form of an infrared thermal emission sensor, in a sealed fashion at a window opening 124 in the inner wall 26' for accomplishing precise measurement of polymer temperature directly from the polymer within the adjacent region of the chamber 30. Each temperature sensor 126 is preferably connected to a main controller for the reactor apparatus 20, which may be a computer or other microprocessor-based programmable controller, whereby temperature measurements may be utilized to initiate programmed variations in the operation of the heat exchange zones 112,114,116 or may otherwise be utilized to control related functions of the reactor apparatus 20.

Figure 14:
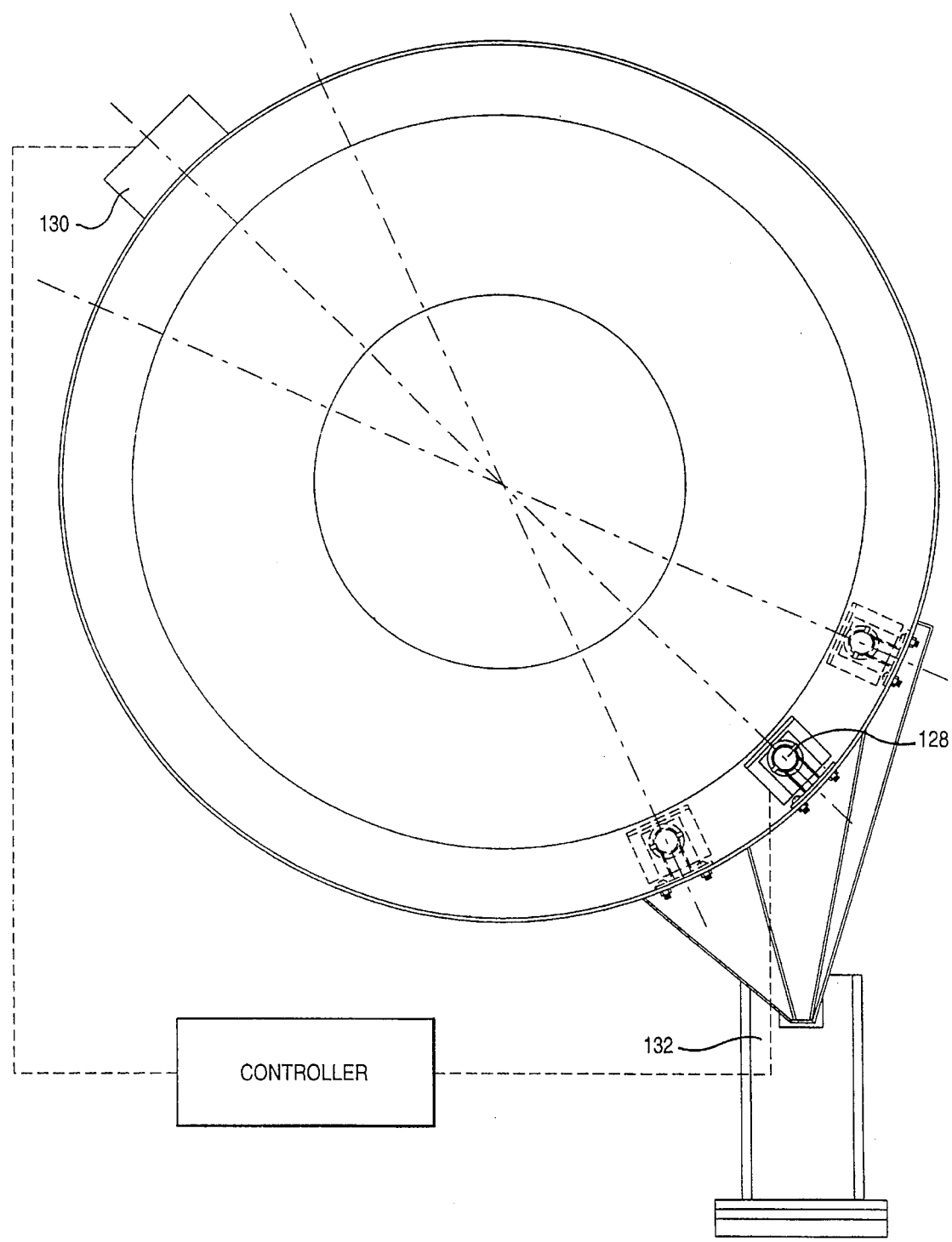
FIG. 14 is a vertical cross-sectional view taken through the reactor apparatus of FIG. 1 along line 14—14 thereof, showing the polymer level detecting arrangement of the apparatus.

The present apparatus also is equipped with a means by which the level of polymer within the process chamber 30 may be detected at any one or more locations along the length of the vessel 22 and, in turn, utilized for controlling polymer input and output to and from the vessel 22 or any other suitable variable or parameter of the process operation of the reactor apparatus 20. More particularly, as shown in FIG. 14, the polymer level detection arrangement utilizes a projection device, indicated representatively at 128, by which a source of a predetermined quantity of nuclear radiation is projected from an exterior location laterally adjacent the underside of the vessel 22 transversely upwardly in a generally radial direction through the vessel 22 toward a radiation detector 128 disposed at the opposite upward exterior side of the vessel 22. The radiation projector 130 and the detector 128 are each operatively connected to the central controller of the reactor apparatus 20 (or another suitable control device) which is programmed to compute the thickness of the polymer within the vertical plane in the chamber 30 through which the radiation is projected as a mathematical function of the difference between the known predetermined quantity of radiation transmitted by the projector 128 and the quantity of the radiation actually received and detected by the detector 130, taking into account by extrapolation the radiation deflected or absorbed by the structure of the vessel 22. Preferably, a polymer level detection arrangement as described is disposed at two or more spaced locations along the length of the vessel 22, including at least locations adjacent the inlet and outlet ends of the vessel.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A reactor apparatus for preparing a polymeric material, comprising:

a reactor vessel defining a horizontally-extending interior polymer processing chamber, a polymer inlet opening into the processing chamber and a polymer outlet opening from the processing chamber at a spacing from one another axially along the processing chamber, and a vapor exhaust outlet opening from the processing chamber, and a polymer agitator rotatably disposed within the chamber, the agitator comprising an annular overflow baffle defining a central polymer overflow opening and an underflow baffle having an outer periphery defining at least one polymer underflow opening between its outer periphery and the vessel, the overflow and underflow baffles being affixed together for unitary rotation in generally parallel axially-spaced relation to one another within the processing chamber to define a portion of a flow path for the polymeric material between the polymer inlet and the polymer outlet extending through the polymer overflow and underflow openings of the overflow and underflow baffles.

2. A reactor apparatus for preparing a polymeric material according to claim 1 and further comprising at least one perforated polymer film-forming screen disposed between the baffles for causing the polymeric material to become coated on the at least one screen in a film form during rotation of the agitator to produce enhanced vapor release from the polymer for polycondensation thereof.

3. A reactor apparatus for preparing a polymeric material according to claim 2 wherein each of the underflow baffle and the screen has a respective central axial opening generally aligned with the overflow opening of the overflow baffle.

4. A reactor apparatus for preparing a polymeric material according to claim 1 wherein the underflow baffle has a central axial opening generally aligned with the overflow opening of the overflow baffle.

5. A reactor apparatus for preparing a polymeric material according to claim 1 wherein the agitator comprises a plurality of connecting elements extending between and affixed to the respective peripheries of the baffles, each connecting element having a wiping surface disposed radially outwardly of the agitator for applying and removing polymer to and from the interior surface of the chamber of the vessel during rotation of the agitator.

6. A reactor apparatus for preparing a polymeric material according to claim 5 wherein the wiping surface comprises a trailing edge of the connecting element.

7. A reactor apparatus for preparing a polymeric material according to claim 1 wherein the overflow opening of the overflow baffle comprises a perforated annulus.

8. A reactor apparatus for preparing a polymeric material according to claim 7 wherein the underflow baffle comprises a perforated annulus generally axially aligned with the overflow opening of the overflow baffle.

9. A reactor apparatus for preparing a polymeric material according to claim 1 wherein the underflow baffle comprises a plurality of circumferentially spaced recesses in its outer periphery defining a corresponding plurality of the underflow openings.

10. A reactor apparatus for preparing a polymeric material according to claim 1 wherein the agitator includes a pair of support disks at the opposite axial ends of the agitator, each support disk having a plurality of openings extending therethrough at differing angles relative to the axis of the agitator.

11. A reactor apparatus for preparing a polymeric material according to claim 10 wherein the support disk at the end of the agitator opposite the inlet of the vessel includes a plurality of blades projecting from an outward side of the support disk for applying and wiping polymeric material to and from the interior surface of the chamber of the vessel during rotation of the agitator.

12. A reactor apparatus for preparing a polymeric material according to claim 1 wherein the vessel includes a passageway extending about the chamber for flow of a heat exchange material in heat transfer relation with the polymeric material in the chamber to control the temperature of the polymeric material.

13. A reactor apparatus for preparing a polymeric material according to claim 12 wherein the passageway is configured for flow of the heat exchange material generally opposite to the direction of flow of the polymeric material within the chamber.

14. A reactor apparatus for preparing a polymeric material according to claim 12 wherein the passageway is configured for flow of the heat exchange material generally in the direction of flow of the polymeric material within the chamber.

15. A reactor apparatus for preparing a polymeric material according to claim 1 and further comprising means supported on the vessel outside the chamber for non-invasive sensing of the temperature of the polymeric material.

16. A reactor apparatus for preparing a polymeric material according to claim 1 and further comprising means for detecting the level of polymeric material within the chamber.

17. A reactor apparatus for preparing a polymeric material, comprising:

a reactor vessel defining a substantially cylindrical horizontally-extending interior polymer processing chamber, a polymer inlet opening into the processing chamber and a polymer outlet opening from the processing chamber at a spacing from one another axially along the processing chamber, and a vapor exhaust outlet opening from the processing chamber, and a polymer agitator rotatably disposed axially within the chamber, the agitator comprising a plurality of polymer flow-controlling baffles and a plurality of perforated polymer film-forming screens affixed together for unitary rotation in generally parallel axially-spaced relation to one another within the processing chamber, the baffles comprising a plurality of annular overflow baffles each having a substantially circular outer periphery disposed in rotational polymer-sealing relation to the vessel and defining a central polymer overflow opening and a plurality of underflow baffles each having an outer periphery defining at least one polymer underflow opening between its outer periphery and the vessel, the overflow and underflow baffles being arranged in alternation with one another axially along the agitator to define a tortuous flow path for the polymeric material between the polymer inlet and the polymer outlet extending alternately through the polymer overflow and underflow openings of the successively alternating overflow and underflow baffles for controlling the residence time, distribution and viscosity of the polymeric material during flow between each overflow baffle and the next succeeding overflow baffle, at least one of the screens being disposed between each adjacent pair Of the baffles for causing the polymeric material to become coated on each screen in a film form during rotation of the agitator to produce enhanced vapor release from the polymer for polycondensation of the polymer.

18. A reactor apparatus for preparing a polymeric material according to claim 17 wherein each of the underflow baffles and the screens has a respective central axial opening generally axially aligned with the overflow openings of the overflow baffles for enhanced vapor flow to the vapor exhaust outlet.

19. A reactor apparatus for preparing a polymeric material according to claim 17 wherein each of the underflow baffles comprises a plurality of circumferentially spaced recesses in its outer periphery defining a corresponding plurality of the underflow openings.

20. A reactor apparatus for preparing a polymeric material according to claim 17 wherein a plurality of the screens are disposed between each adjacent pair of the baffles.

21. A reactor apparatus for preparing a polymeric material according to claim 20 wherein the screens are arranged at increasing spacings from one another and from the baffles from adjacent the polymer inlet to adjacent the polymer outlet of the chamber.

22. A reactor apparatus for preparing a polymeric material according to claim 20 wherein the screens have increased open area from adjacent the polymer inlet to adjacent the polymer outlet of the chamber.

23. A reactor apparatus for preparing a polymeric material according to claim 17 wherein the overflow opening of each overflow baffle comprises a perforated annulus.

24. A reactor apparatus for preparing a polymeric material according to claim 17 wherein the overflow openings of the overflow baffles are of increasing diametric dimensions from adjacent the polymer inlet to adjacent the polymer outlet.

25. A reactor apparatus for preparing a polymeric material according to claim 17 wherein each underflow baffle comprises a perforated annulus.

26. A reactor apparatus for preparing a polymeric material according to claim 17 wherein the agitator comprises a plurality of connecting elements extending between and affixed to the respective peripheries of the baffles and the screens, each connecting element having a wiping surface disposed radially outwardly of the agitator for applying and removing polymer to and from the interior surface of the chamber of the vessel during rotation of the agitator.

27. A reactor apparatus for preparing a polymeric material according to claim 26 wherein the wiping surface comprises a trailing edge of the connecting element.

28. A reactor apparatus for preparing a polymeric material according to claim 27 wherein each screen is formed with peripheral slots configured for receiving the connecting elements with a polymer drainage opening defined between the screen and each connecting element.

29. A reactor apparatus for preparing a polymeric material according to claim 17 wherein the agitator includes a pair of support disks at the opposite axial ends of the agitator, each support disk having a plurality of openings extending therethrough at differing angles relative to the axis of the agitator.

30. A reactor apparatus for preparing a polymeric material according to claim 29 wherein the support disk at the end of the agitator opposite the inlet of the vessel includes a plurality of blades projecting from an outward side of the support disk for wiping polymeric material from the interior surface of the chamber of the vessel during rotation of the agitator.

31. A reactor apparatus for preparing a polymeric material according to claim 17 wherein the vessel includes a passageway extending about the chamber for flow of a heat exchange material in heat transfer relation with the polymeric material in the chamber to control the temperature of the polymeric material.

32. A reactor apparatus for preparing a polymeric material according to claim 31 wherein the passageway is configured for flow of the heat exchange material generally opposite to the direction of flow of the polymeric material within the chamber.

33. A reactor apparatus for preparing a polymeric material according to claim 31 wherein the passageway is configured for flow of the heat exchange material generally in the direction of flow of the polymeric material within the chamber.

34. A reactor apparatus for preparing a polymeric material according to claim 31 wherein at least a portion of the passageway defines a generally helical flow path for the heat exchange material.

35. A reactor apparatus for preparing a polymeric material according to claim 17 and further comprising means supported on the vessel outside the chamber for non-invasive sensing of the temperature of the polymeric material.

36. A reactor apparatus for preparing a polymeric material according to claim 35 wherein the vessel comprises a sealed window bordering the processing chamber and the temperature sensing means comprises an infrared thermal emission sensor disposed outside the processing chamber to face into the processing chamber through the window.

37. A reactor apparatus for preparing a polymeric material according to claim 17 and further comprising means for detecting the level of polymeric material within the chamber.

38. A reactor apparatus for preparing a polymeric material according to claim 37 wherein the level detecting means comprises means for projecting a source of a predetermined quantity of radiation generally radially through the processing chamber from one side thereof, means for detecting the quantity of the projected radiation at the opposite side of the chamber, and means for extrapolating the level of the polymer at the location of the radiation projection based on the difference between the projected and detected quantities of the radiation.

39. A reactor apparatus for preparing a polyester material, comprising:

a reactor vessel defining a substantially cylindrical horizontally-extending interior polymer processing chamber, a polymer inlet opening into the processing chamber adjacent one end thereof and a polymer outlet opening from the processing chamber adjacent the opposite end thereof, a vapor exhaust outlet opening from the processing chamber, and an annular passageway extending exteriorly about the chamber with at least a portion of the passageway defining a generally helical path for flow of a heat exchange material with and opposite to the direction of flow of the polymeric material within the chamber for heat transfer relation with the polymeric material in the chamber to control the temperature of the polymeric material;

a polymer agitator rotatably disposed axially within the chamber, the agitator comprising a plurality of polymer flow-controlling baffles, a plurality of perforated polymer film-forming screens, a pair of support disks at opposite axial ends of the agitator, and a plurality of connecting elements extending between the respective peripheries of the support disks, the baffles and the screens for fixation thereof in generally parallel axially-spaced relation to one another for unitary rotation within the processing chamber, each connecting element having a trailing wiping surface disposed radially outwardly of the agitator for applying and removing polymer to and from the interior surface of the chamber of the vessel during rotation of the agitator;

the baffles comprising a plurality of annular overflow baffles each having a substantially circular outer periphery disposed in rotational polymer-sealing relation to the vessel and defining a central polymer overflow opening including a perforated annulus, the polymer overflow openings of the overflow baffles being of increasing diametric dimensions and the annuli of the overflow baffles having increasing open area from adjacent the polymer inlet end to adjacent the polymer outlet end of the chamber, and a plurality of underflow baffles each having an outer periphery comprising a plurality of circumferentially spaced recesses forming polymer underflow openings between its outer periphery and the vessel and defining a central vapor flow opening generally axially aligned with the overflow openings of the overflow baffles, the overflow and underflow baffles being arranged in alternation with one another axially along the agitator to define a tortuous flow path for the polymeric material between the polymer inlet and the polymer outlet extending alternately through the polymer overflow and underflow openings of the successively alternating overflow and underflow baffles for controlling the residence time, distribution and viscosity of the polymeric material during flow between each overflow baffle and the next succeeding overflow baffle;

a plurality of the screens being disposed between each adjacent pair of the baffles for causing the polymeric material to become coated on each screen in a film form during rotation of the agitator to produce enhanced vapor release from the polymer for polycondensation of the polymer, each of the screens having a respective central vapor flow opening generally axially aligned with the overflow openings of the overflow baffles and the vapor flow openings of the underflow baffles, the screens being arranged at increasing spacings from one another and from the baffles and having increasing open area from adjacent the polymer inlet end to adjacent the polymer outlet end of the chamber; and each support disk having a plurality of openings extending therethrough at differing angles relative to the axis of the agitator, the support disk at the end of the agitator adjacent the outlet end of the vessel including a plurality of blades projecting from an outward side of the support disk for wiping polymeric material from the interior surface of the chamber of the vessel during rotation of the agitator.

\* \* \* \* \*